United States Patent
Schicht et al.

(10) Patent No.: US 6,432,545 B1
(45) Date of Patent: Aug. 13, 2002

(54) GLAZING PROVIDED WITH A LOW-EMISSIVITY MULTILAYER STACK

(75) Inventors: Heinz Schicht, Bethau; Uwe Schmidt, Falkenberg/Elster; Wilfried Kaiser; Herbert Schindler, both of Torgau, all of (DE)

(73) Assignee: Saint-Gobain Vitrage, Aubervillers Cedex (FR)

( * ) Notice: Subject to any disclaimer, the term of this patent is extended or adjusted under 35 U.S.C. 154(b) by 39 days.

(21) Appl. No.: 09/616,074

(22) Filed: Jul. 13, 2000

Related U.S. Application Data

(63) Continuation of application No. PCT/FR99/02764, filed on Nov. 10, 1999.

(30) Foreign Application Priority Data

Nov. 13, 1998 (DE) .......................... 198 52 358

(51) Int. Cl.$^7$ .................. B32B 17/06; B32B 15/04; B32B 15/20
(52) U.S. Cl. ............... 428/432; 428/428; 428/448; 428/450; 428/472; 428/698; 428/702
(58) Field of Search ............... 428/432, 428, 428/446, 448, 450, 469, 673, 472, 698, 702

(56) References Cited

FOREIGN PATENT DOCUMENTS

| DE | DD 288 822 | 4/1991 |
|---|---|---|
| DE | 196 07 611 | 10/1997 |
| DE | 196 32 788 | 2/1998 |
| DE | 197 32 978 | 11/1998 |
| DE | 198 52 358 | 11/1999 |
| EP | 0 751 099 | 1/1997 |
| EP | 0 824 091 | 8/1998 |
| EP | 0 877 005 | 11/1998 |
| WO | WO 29347 | 5/2000 |

OTHER PUBLICATIONS

Derwent Abstract of European Patent No. 0 792 847, 09/97.
Derwent Abstract of European Patent No. 0 824 091, 08/98.
Derwent Abstract of European Patent No. 0 877 005, 11/98.
Derwent Abstract of German Patent No. 228 822, 04/91.
Derwent Abstract of German Patent No. 196 07 611, 10/97.
Derwent Abstract of German Patent No. 196 32 788, 02/98.
Derwent Abstract of German Patent No. 197 32 978, 11/98.

*Primary Examiner*—Deborah Jones
*Assistant Examiner*—Andrew T Piziali
(74) *Attorney, Agent, or Firm*—Pennie & Edmonds LLP

(57) ABSTRACT

The invention is a transparent substrate provided with a multilayer stack having thermal properties, especially solar-control or low-emissivity properties. The stack comprises at least one silver-based functional layer surrounded by at least two coatings made of dielectric material, with the presence of thin metal layers between the functional layer and at least one of the coatings made of dielectric material. A preferred stack is $D_1/ZnO/Ag/AlM/D_2/ZnM'O$, with AlM representing an aluminum alloy, ZnM'O a mixed oxide of zinc and at least one other metal, with $D_1$ and $D_2$ being a layer or a superposition of layers comprising at least one layer made of a metal oxide, silicon nitride, metal nitride or made of a mixed silicon/metal nitride.

20 Claims, No Drawings

GLAZING PROVIDED WITH A LOW-EMISSIVITY MULTILAYER STACK

CROSS REFERENCE TO RELATED APPLICATION

This application is a continuation of the U.S. national phase designation of international application no. PCT/FR99/02764 filed Nov. 10, 1999, the content of which is expressly incorporated herein by reference thereto.

FIELD OF THE INVENTION

The invention is directed to stacks of thin layers having thermal properties, especially solar-control or low-emissivity properties. The stacks being placed on transparent substrates in order to make windows for buildings and vehicles from them. The transparent substrates are organic substrates, of the polyacrylate or polymethyl methacrylate type or preferably, glass substrates. Preferably, the invention is directed to multilayer stacks capable of withstanding heat treatments at high temperatures of at least about 500° C. to about 550° C., which are used for treating glass for the purpose of bending, annealing and/or toughening it.

BACKGROUND OF THE INVENTION

The stacks involved use silver-based functional layers surrounded by coatings made of dielectric material, especially for reducing light reflection, optionally having so-called "blocker" or "sacrificial" metal layers between the functional layer and at least one of the coatings made of dielectric material.

Glazings provided with a low-emissivity multilayer stack make it possible to increase the thermal insulation. In the case of insulating glazing, it is possible, by the use of glass having an emissivity $\epsilon \leq 0.1$, on the face turned towards the intermediate gas layer, to substantially eliminate radiative exchange between the glass surfaces. Consequently, it becomes possible to manufacture insulating glazing having a K value of 1.1 W/m²K. Glazing having optimal low-emissivity multilayer stacks must, moreover, also have an overall energy transmission as high as possible, that is to say a g value as high as possible, in order to be able to use the solar energy within the energy budget. From the optical standpoint, the reflection color of the glazing must be relatively neutral, similar to that of conventional insulating glazing, and it is also attempted to obtain a light transmission as high as possible.

Multilayer stacks which at the very least partially fulfil these conditions have already been studied in various different forms and have, in principle, the general structure mentioned above.

Throughout this text, the term "transparent substrate" will generally be referred to as glass, but it being understood that this term may also encompass substrates made of plastics or other organic polymers. The substrate is only glass in the literal sense when it can withstand a heat treatment, such as bending or toughening at temperatures of about 550° C. to about 650° C.

It is becoming increasingly necessary to develop glazing products having low-emissivity multilayer stacks, which may be subjected to a prestressing heat treatment in order to increase the flexural strength of the glass and to give the glass safety properties. For this purpose, glass panes have to be heated to a temperature of more than 550° C. to 650° C., that is to say heated to their softening temperature, and then have to be suddenly cooled, when a toughening operation is involved. In this case, the layers are exposed to particularly high stresses which cannot always be withstood by the known low-emissivity stacks without deterioration. In the case of thermal stresses, layer modifications may in particular often occur which stem especially from oxidation and/or diffusion phenomena at the interface between the various layers.

Particular importance is attached, during a heat treatment of this kind, to the two sacrificial metal layers adjacent to the silver layer. Document DE 19,632,788 Al discloses a multilayer stack suitable for curved and/or prestressed (toughened) glass in which the sacrificial metal layers above and below the silver layer are composed each time of an AlMgMn alloy and have a thickness of 5 to 10 nm. At least one of the dielectric antireflection layers may be formed from several different oxides of the metals Sn, Zn, Ti, Si and Bi. In the case of this known multilayer system, the silver layer is admittedly protected against corrosion and deterioration by means of the two special layers of blockers at the high temperatures of the heat treatment, but it is not possible to achieve, however, in a satisfactory manner, simultaneously a very high light transmission, a very low emissivity and the desired color neutrality.

The present invention develops a multilayer stack which has a high overall light transmission, an extremely low emissivity and a neutral reflection color. This being so even after the stack has undergone a heat treatment at a moderate or a very high temperature, especially a treatment above about 550° C. in order to curve, toughen or anneal the glass supporting the stack.

SUMMARY OF THE INVENTION

The present invention is directed to a transparent substrate comprising a multilayer stack comprising at least one silver-based functional layer between at least two layers of dielectric material with a metal layer provided between the silver-based functional layer and at least one of the dielectric material layers or coatings. The metal layer is an aluminum alloy of the formula AlM where M is at least one of the elements selected from the group consisting of Mg, Mn, Cu, Zn, Ni and Si. In one embodiment, the stacks can withstand a high-temperature heat treatment and have thermal properties, solar-control properties or low-emissivity properties.

In one particular embodiment, the stack comprises the layer sequence:

$D_1/ZnO/Ag/AlM/D_2/ZnM'O$ wherein Ag denotes the silver-based functional layer, AlM is an aluminum alloy containing at least one of the elements selected from the group consisting of Mg, Mn, Cu, Zn, Ni and Si; ZnM'O is a mixed oxide of zinc and at least one other metal designated at M', and the ZnM'O has a spinel structure; $D_1$, $D_2$ or both are a layer or a superposition of layers comprising at least one layer made of a metal oxide selected from the group consisting of $SnO_2$, $Bi_2O_3$, $TiO_2$, ZnO, silicon nitride, a metal nitride, a mixed silicon/metal nitride and mixtures thereof. The mixed silicon/metal nitride can be selected from the group consisting of $Si_3N_4$, AlN, SiAlN, SiZrN and mixtures thereof.

$D_1$, $D_2$, or both can be a superposition of three layers having a low refractive index of less than 1.75. $D_1$, $D_2$, or both are made of $SiO_2$ optionally containing $Al_2O_3$, flanked by two layers having a refractive index greater than 1.9 and made of compounds selected from the group consisting of $SnO_2$, $Bi_2O_3$, $TiO_2$, ZnO, $Si_3N_4$, AlN, SiAlN, SiZrN and mixtures thereof.

The aluminum alloy AlM may comprise from about 45% to about 99% by weight of aluminum and from about 55% to about 1% by weight of one or more other metals. Preferably, the aluminum alloy AlM comprises more than about 80% aluminum, from about 2% to about 8% zinc and from 0% to about 3% magnesium.

In another embodiment of the invention, the stacks may further comprise a metal layer inserted between the ZnO layer and the silver layer wherein the metal is Zn.

The mixed zinc oxide ZnM'O is obtained by reactive sputtering using a target made of a metal alloy containing Zn, Sn and Al, Sb, or a mixture thereof. Preferably, the mixed zinc oxide ZnM'O is obtained by reactive sputtering using a target made of a metal alloy containing Zn present in an amount of about 60% to about 80%, Sn present in an amount of about 20% to about 40% and Al or Sb present in an amount of about 1% to 5% by weight of the alloy. Preferably, the metal alloy comprises about 68% Zn, about 30% Sn and about 2% Al or Sb by weight.

The invention also comprises a monolithic, laminated or multiple glazing comprising a transparent glazing sheet that includes on one surface the transparent substrate described herein. Preferably, the glazing sheet is glass or plastic.

DETAILED DESCRIPTION OF THE INVENTION

The invention is directed to a transparent substrate, especially a glass substrate, provided with a multilayer stack having thermal properties, especially solar-control or low-emissivity properties, which is especially capable of undergoing the above-mentioned heat treatments and which comprises at least one silver-based functional layer surrounded by two coatings made of dielectric material, with the presence of metal layers, preferably thin layers, between the functional layer and at least one of the two coatings. The stack of the invention is characterized by the following sequence:

$$D_1/ZnO/Ag/AlM/D_2/ZnM'O$$

wherein AlM is an aluminum alloy containing at least one of the following elements: Mg, Mn, Cu, Zn, Ni, Si; ZnM'O is a mixed oxide of zinc and at least one other metal, preferably having a spinel structure; $D_1$, $D_2$ or both are either a layer or a superposition of layers comprising at least one layer made of a metal oxide such as $SnO_2$, $Bi_2O_3$, $TiO_2$, ZnO or made of silicon nitride or of a metal nitride such as $Si_3N_4$ or AlN or made of a mixed silicon/metal nitride, such as SiAlN or SiZrN.

The formulae AlM, ZnM'O, SiAlN and SiZrN make no assumptions about the stoichiometry of each of the elements and have been adopted for the sake of simplifying the text. It goes without saying that $Al_zM_y$, $Zn_xM'_yO_z$, etc., are also included where x, y, z, are integers.

"Thin layers" as used herein, unless otherwise define should be understood to mean layers deposited in essentially metallic form and with a thickness substantially less than that of the silver layer, of the order of about 0.5 nm to about 5 nm, which layers are capable of being partially oxidized/modified during the deposition or during a heat treatment after the deposition. These layers are often referred to by the term "sacrificial" layers when above the silver or "blocker" layers, when above and/or below the silver.

Advantageously, $D_1$ and/or $D_2$ are single, double or triple layers. This may be, in a preferred embodiment, a superposition of three layers, including at least one layer having a low index of refraction of less than about 1.75 and preferably, less than about 1.65, such as about 1.45 to about 1.63. The central layer can be made of $SiO_2$ and/or $Al_zO_y$ and flanked by two layers of higher refractive index, for example greater than about 1.9, preferably about 2 to about 2.5 and made of materials mentioned above such as: $Bi_2O_3$, $SnO_2$, $TiO_2$, ZnO, $Si_3N_4$, AlN, SiAlN and SiZrN.

Preferably, the aluminum alloy AlM comprises from about 45% to about 99% by weight of Al and from about 55% to about 1% by weight of one or more other metals or similar materials, such as silicon. It may especially be an alloy containing by weight at least about 80% Al, preferably from about 90% to about 98% Al, from about 15 2% to about 3% Zn and from 0% to about 3% Mg. An example is an alloy comprising approximately 94% Al, 5% Zn and 1% Mg by weight.

Preferably, a metal layer is inserted between the ZnO layer beneath the silver layer and the silver layer. It is preferably made of Zn. It may also be made of other metals, such as Sn, Ti and NiCr.

Preferably, the mixed zinc oxide ZnM'O is obtained by reactive sputtering using a target made of a metal alloy containing Zn, Sn and Al and/or Sb, especially in the following proportions by weight: Zn present in an amount of about 60% to about 80%, preferably about 68%; Sn present in an amount of about 20% to about 40%, preferably about 30%; and Al or Sb present in an amount of about 1% to about 5%, preferably about 2%.

In general, it may be considered that these proportions are more or less maintained in the mixed oxide layer thus obtained. It is preferable for the Zn proportion with respect to the other metals in the layer to be at least about 50% and preferably at most about 75% to about 80%, thereby allowing a spinel structure to be produced. With too high an amount of zinc, there is a risk of forming ZnO particles and of affecting the chemical durability of the layer. The third element Al or Sb allows the ZnO particles to be "doped" and thus to make them more moisture resistant. The fact is that the layer of the invention is particularly hard and thus serves as a hard overlayer for protecting the rest of the stack.

The following are three non-limiting embodiments of stacks, preferably on glass:

(a) $SnO_2/ZnO/Zn/Ag/AlZnMg/SnO_2/ZnSnAlO$;

(b) $SnO_2/ZnO/Zn/Ag/AlZnMg/SnO_2/SiO_2/SnO_2/ZnSnAlO$; and (c) $SnO_2/ZnO/Zn/Ag/AlZnMg/SnO_2/Al_2O_3/SnO_2/ZnSnAlO$;

wherein AlZnMg and ZnSnAlO are made without any assumptions about the relative proportions between the various elements of each of the two types of layers. It should be noted that it is possible to replace Al with Sb in the layer of mixed zinc oxide.

A subject of the invention is also the monolithic, single rigid substrate, laminated or multiple glazing incorporating the coated substrate described above.

Another preferred embodiment of the present invention relates to a multilayer stack having the following structure of layers: glass —MO—ZnO—Zn—Ag—AlM—MO—ZnMO, wherein MO is a metal oxide such as $SnO_2$, $Bi_2O_3$, $TiO_2$ or ZnO, AlM is an aluminum alloy containing one or more of the elements Mg, Mn, Cu, Zn and Si as the alloying constituent, and is ZnMO being a composite oxide, containing ZnO, of the spinel type.

In these preferred embodiments, it is only by virtue of the interaction of the various layers, namely the Zn metal layer, which is optional, as the lower sacrificial metal layer, the Al alloy as the upper sacrificial metal layer and an upper antireflection layer with a partial layer made of a mixed oxide, advantageously containing ZnO and having a spinel structure, that a multilayer stack capable of undergoing bending or toughening is produced, which stack fulfils all the requirements with regard to extremely low emissivity, light transmission and color neutrality in reflection and which can, in addition, be manufactured in industrial deposition plants without any technical problem and in an economic manner.

DE 19,607,611 Cl discloses multilayer stacks in which the dielectric antireflection layers are composed of ZnO may be subjected to high thermal stresses and are suitable for prestressing the glass. Sputtering ZnO often causes a problem during practical operation in the sputtering chamber: more deposits are formed than for other metal oxides, which deposits disturb the sputtering process and result in defective layers. This drawback is minimized in the case of the multilayer stack according to the invention because of the fact that, in order to form the antireflection layers, ZnO is used to a lesser extent for forming the partial layer, while the other partial layers are formed from other oxides, such as $SnO_2$ for example, which exhibit much better behavior during the sputtering process. The term "partial" as used herein, unless otherwise indicated, means that ZnO does not constitute the entire thickness of the dielectric coatings on either side of the silver layer.

For the aluminum alloy forming the upper sacrificial metal layer, alloys having an Al content from about 45% to about 99% by weight are preferably used.

A preferred composition of the spinel-type mixed zinc oxide according to the invention comprises from about 35% to about 70% by weight of Zn, from about 29% to about 64.5% by weight of Sn and from about 0.5% to about 6.5% by weight of at least one of the following elements: Al, Ga, In, B, Y, La, Ge, Si, P, As, Sb, Bi, Ce, Ti, Zr, Nb and Ta.

Advantageous improvements will be explained in detail below using the non-limiting illustrative examples.

EXAMPLES

Certain embodiments of the invention, as well as certain novel and unexpected advantages of the invention, are illustrated by the following non-limiting examples.

Comparative Example and Illustrative Example

It is necessary to subject glasses provided with a multilayer system to a thermal prestress, the coated glasses having to have, after the prestress, the same optical properties as the glass/25 nm of $SnO_2$/8 nm of ZnO/13.3 nm of Ag/2 nm of CrNi/44 nm of $SnO_2$ multilayer system (the comparative example) when it is not subjected to a corresponding heat treatment. The prestressed coated glasses must in fact be able to be used in facades alongside glasses coated with the abovementioned multilayer system, it being necessary for there to be no significant difference in their emissivity and optical properties in terms of light transmission and reflection.

In order to evaluate their properties, using 6 mm thick float glasses provided with the abovementioned comparative multilayer system, the following measurements are made: (a) measurement of the light transmission $T_L$ at 550 nm; (b) measurement of the color properties in reflection in the L, a*, b* system; (c) measurement of the electrical surface resistance; and (d) measurement of the emissivity.

The aforementioned known multilayer stack is deposited on a 6 mm thick non-prestressed float glass and the abovementioned measurements are made at three points distributed over the surface of the glass. The following average values are obtained: $T_{550}$=81.49%; a*=−0.32; b*=−7.81; R=4.44 Ω/□; and ε=4.9%.

By increasing the thickness of the CrNi sacrificial metal layer from 2 nm to approximately 5 nm, the abovementioned multilayer structure may be modified to such an extent that the multilayer system withstands heating to approximately 680° C. and a subsequent prestressing treatment without the silver layer being destroyed. Before the heat treatment, the light transmission because of the thicker sacrificial metal layer is only approximately TL=69%.

After the heat treatment and the prestressing treatment, the abovementioned properties are measured again and the following values are obtained on average: $T_{550}$=80.2%; a*=+2.1; b*=−4.98; R=3.4 Ω/□; ε=3.95%.

The light transmission and the color values, particularly the value a*, lie outside the permissible limiting values. In addition, the glasses exhibit a relatively strong red bloom in reflection in grazing light.

Illustrative Example 1

In the case of this illustrative example according to the invention, a 6 mm thick float glass is provided with the following multilayer system: glass; 25 nm of $SnO_2$; 8 nm of ZnO; 4 nm of Zn; 13.5 nm of Ag; 3 nm of AlZnMg; 40 nm of $SnO_2$; 4 nm of $Zn_xSn_yAl_zO_n$, wherein the target which is sputtered for producing the AlZnMg sacrificial layer is based on an alloy comprising 94% by weight Al, 6% by weight Zn and 1% by weight Mg. The layer obtained having a composition very close to that of the target. A target comprising 68% Zn, 30% Sn and 2% Al by weight is used for producing the zinc oxide mixed layer.

The measurements made before a heat treatment at three different points on the layer lead to the following average values: $T_{550}$=83.1%; a*=−0.4; b*=−7.2; R=4.2 Ω/□; and ε=4.69%.

The measured values lie within the predetermined limiting values: the glasses with this multilayer structure may be placed, without subsequent heat treatment, beside glasses with the comparative multilayer system without them being able to be visually differentiated from the latter.

When the glasses having this multilayer system have to undergo thermal prestressing, the thickness of the AlZnMg sacrificial metal layer has to be increased to such an extent that the transmission of the multilayer system is reduced to a value of 70%; its thickness is then approximately 7 nm. The rest of the multilayer structure remains unchanged. By virtue of the thicker sacrificial metal layer, the color values are modified, for a measurement at three different points, on average as follows: a* =0.31; b*=−12.37.

The glasses provided with the thicker sacrificial metal layer are subjected to the same heat treatment and to the same prestressing treatment as the comparative multilayer system. The abovementioned properties are then measured again on different specimens. The measurements give on average the following values: $T_{550}$=83.5%; a*=−0.4; b*=−7.0; R=2.9 Ω/□; and ε=3.36%.

After the prestressing, the optical values lie within the predetermined limiting values. The multilayer stack exhibits no defect. In grazing light, no red bloom is visible, even under difficult conditions. The electrical surface resistance and the emissivity are extremely low.

Illustrative Example 2

A 6 mm float glass designed to be subsequently heat treated is provided with the following multilayer stack:

glass; 20 nm of $SnO_2$; 16 nm of ZnO; 4 nm of Zn; 13.5 nm of Ag; 7 nm of AlZnMg; 25 nm of $SnO_2$; 15 mm of $SiO_2$; 8 nm of $SnO_2$; and 4 nm of ZnSnAlO; wherein the same targets as in Example 1 are used for producing the AlZnMg and ZnSnAlO layers; a silicon target possibly containing a little Al or Ni is used for producing the $SiO_2$ layer. For example, the layer may contain from 6 to 10% by weight Al or from 6 to 9% by weight Ni. This addition favors the sputtering process, preferably carried out using rotating cathodes.

Before the heat treatment, the light transmission measurements a* and b* at three points give the following results: $T_{550}$=70%; a*=+2.64; and b*=−0.11. The coated glass is then heated to its softening temperature in order to be curved. The measurements are made again at different points, giving: $T_{550}$=84.5%; a*=−0.86; and b*=2.9.

The values of surface resistance and emissivity are virtually the same as for the first illustrative example. The measured colorimetric values show that the intensity of the color in reflection is further reduced; there is even greater color neutrality in reflection.

In general, it may be regarded as being advantageous to set the thickness of the sacrificial layer beneath the silver at between 1 nm and 6 nm, especially between 3 nm and 5 nm.

In the same manner, at is advantageous to choose the thickness of the aluminum-alloy-based sacrificial layer on the silver to be at least 1 or 2 nm, especially at least 3 and up to 10 nm.

With regard to the mixed oxide overlayer, a satisfactory thickness range may be from at least 2 nm, especially from 3 to 8 nm, for example 3 to 6 nm.

What is claimed is:

1. A transparent substrate comprising a multilayer stack that includes at least one silver-based functional layer positioned between one or more first dielectic layers and one or more second dielectric layers, wherein the first dielectric layers are closest to the substrate; a metal layer provided between the silver-based functional layer and at least one of the dielectric layers; and a layer comprising Zn, Sn, Ti, or NiCr between the first dielectric layer and the Ag layer; wherein the metal layer is an aluminum alloy of the formula AlM where M is at least one of the elements selected from the group consisting of Mg, Mn, Cu, Zn, Ni and Si; and the one or more second dielectric layer comprises a layer of mixed oxides of zinc and at least one other metal that has a spinel structure.

2. The transparent substrate comprising a multilayer stack comprising the following sequence of layers:

$D_1$/ZnO/Ag/AlM/$D_2$/ZnM'O wherein Ag denotes a silver-based functional layer, AlM denotes an aluminum alloy layer of formula AlM where M is at least one of the elements selected from the group consisting of Mg, Mn, Cu, Zn, Ni and Si; ZnM'O is a mixed oxide of zinc and at least one other metal designated as M'; and D1, $D_2$ or both are a layer or a superposition of layers comprising a metal oxide selected from the group consisting of $SnO_2$, $Bi_2O_3$, $TiO_2$, ZnO, silicon nitride, a metal nitride, a mixed silicon/metal nitride and mixtures thereof.

3. The transparent substrate according to claim 2, wherein the mixed silicon/metal nitride is selected from the group consisting of $Si_3N_4$, AlN, SiAlN, SiZrN and mixtures thereof.

4. The transparent substrate according to claim 2, wherein the ZnM'O has a spinel structure.

5. The transparent substrate according to claim 2, wherein $D_1$, $D_2$, or both are a superposition of three layers having a refractive index of less than 1.75.

6. The transparent substrate according to claim 2, wherein $D_1$, $D_2$, or both are made of $SiO_2$, optionally containing $Al_2O_3$, flanked by two layers having a refractive index greater than 1.9 and made of compounds selected from the group consisting of $SnO_2$, $Bi_2O_3$, $TiO_2$, ZnO, $Si_3N_4$, AlN, SiAlN, SiZrN and mixtures thereof.

7. The transparent substrate according to claim 1, wherein the aluminum alloy AlM comprises from about 45% to about 99% by weight of aluminum and from about 55% to about 1% by weight of one or more other metals designated as M.

8. A transparent substrate comprising a multilayer stack comprising at least one silver-based functional layer positioned between at least two layers of dielectric material, with a metal layer provided between the silver-based functional layer and at least one of the dielectric material layers, wherein the metal layer is an aluminum alloy of the formula AlZnMg that comprises more than about 80% aluminum, from about 2% to about 8% zinc and from 0% to about 3% magnesium.

9. The transparent substrate according to claim 2, further comprising a further metal layer inserted between the ZnO layer and the silver layer.

10. The transparent substrate according to claim 9, wherein the further metal layer includes zinc, and the mixed zinc oxide ZnM'O is obtained by reactive sputtering using a target made of a metal alloy having Zn, Sn and Al, Sb or a mixture thereof.

11. The transparent substrate according to claim 10, wherein the mixed zinc oxide ZnM'O is obtained by reactive sputtering using a target made of a metal alloy containing Zn present in an amount of about 60% to about 80%, Sn present in an amount of about 20% to about 40% and Al or Sb present in an amount of about 1% to 5% by weight of the alloy.

12. The transparent substrate according to claim 11, comprising about 68% Zn, about 30% Sn and about 2% Al or Sb by weight.

13. The transparent substrate according to claim 9, wherein the stack has the following sequence of layers:

$SnO_2$/ZnO/Zn/Ag/AlZnMg/$SnO_2$/ZnSnAlO or ZnSnSbO.

14. The transparent substrate according to claim 9, wherein the stack has the following sequence of layers:

$SnO_2$/ZnO/Zn/Ag/AlZnMg/$SnO_2$/$SiO_2$/$SnO_2$/ZnSnAlO or ZnSnSbO.

15. The transparent substrate according to claim 9, wherein the stack has the following sequence of layers:

$SnO_2$/ZnO/Zn/Ag/AlZnMg/$SnO_2$/$Al_2O_3$/$SnO_2$/ZnSnAlO or ZnSnSbO.

16. A monolithic, laminated or multiple glazing comprising a transparent glazing sheet that includes on one surface the transparent substrate according to claim 1.

17. The glazing according to claim 16 wherein the glazing sheet is glass or plastic.

18. A transparent substrate comprising a multilayer stack that includes at least one silver-based functional layer positioned between one or more first dielectic layers and one or more second dielectric layers, wherein the first dielectric layers are closest to the substrate, wherein the metal layer is an aluminum alloy of the formula AlM where M is at least one of the elements selected from the group consisting of Mg, Mn, Cu, Zn, Ni and Si;

the at least one first dielectric layer is in direct contact with the at least one silver based functional layer; and the second dielectric layer comprises a mixed oxide of zinc and has a spinel structure.

19. A transparent substrate comprising a multilayer stack that includes at least one silver-based functional layer positioned between one or more first dielectic layers and one or more second dielectric layers, wherein the first dielectic layers are closest to the substrate, and a layer comprising Zn, Sn, Ti, or NiCr between the first dielectric layer and the Ag layer, wherein the metal layer is an aluminum alloy of the formula AlM where M is at least one of the elements selected from the group consisting of Mg, Mn, Cu, Zn, Ni and Si; and the one or more second dielectric layers comprises a layer of ZnSnAlO or ZnSnSbO.

20. A transparent substrate comprising a multilayer stack that includes at least one silver-based functional layer positioned between one or more first dielectic layers and one or more second dielectric layers, wherein the first dialectic layers are closest to the substrate, and a layer comprising Zn, Sn, Ti, or NiCr between the first dielectric layer and the Ag layer, wherein the metal layer is an aluminum alloy of the formula AlM where M is at least one of the elements selected from the group consisting of Mg, Mn, Cu, Zn, Ni and Si;

the at least one first dielectric layers is in direct contact with the at least one silver based functional layer; and the one or more second dielectric layers comprises a layer of ZnSnAlO or ZnSnSbO.

* * * * *

UNITED STATES PATENT AND TRADEMARK OFFICE
CERTIFICATE OF CORRECTION

PATENT NO. : 6,432,545 B1
DATED : August 13, 2002
INVENTOR(S) : Heinz Schicht et al.

It is certified that error appears in the above-identified patent and that said Letters Patent is hereby corrected as shown below:

<u>Title page,</u>
Item [30], Foreign Application Priority Data, replace the German Application No. "198 52 358" with -- 198 52 358.0 --.

<u>Column 7,</u>
Lines 36 and 37, replace the term "dielectic" with -- dielectric --.
Line 46, replace the phrase "layer comprises" with -- layers comprise --.
Line 58, replace the term "D1" with -- $D_1$ --.

<u>Column 8,</u>
Line 58, replace the term "dielectic" with -- dielectric --.
Line 65, replace the phrase "silver based" with -- silver-based --.

<u>Column 9,</u>
Lines 3 and 4, replace the term "dielectic" with -- dielectric --.

<u>Column 10,</u>
Lines 1 and 2, relace the term "dielectic" with -- dielectric --.
Line 5, replace the phrase "layer, wherein the metal" with -- layer, and wherein: the metal --.
Line 9, replace the term "layers" with -- layer --.
Line 10, replace the phrase "silver based" with -- silver-based --.

Signed and Sealed this

Twenty-fifth Day of March, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,432,545 B1
DATED : February 13, 2003
INVENTOR(S) : Heinz Schict et al.

It is certified that error appears in the above-identified patent and that said Letters Patent is hereby corrected as shown below:

Column 8,
Line 60, replace the phrase "substrate, wherein the metal layer" with -- substrate, and a metal layer provided between the silver-based functional layer and at least one of the dielectric layers, wherein:
    the metal layer --.

Column 9,
Line 5, replace the phrase "substrate, and" with -- substrate; --.
Line 7, replace the phrase "layer, wherein" with -- layer; and a metal layer provided between the silver-based functional layer and at least one of the dielectric layers, wherein: --.

Column 10,
Line 3, replace the phrase "substrate, and" with -- substrate; --.
Line 5, replace the phrase "layer, wherein the metal layer" with -- layer; and a metal layer provided between the silver-based functional layer and at least one of the dielectric layers, wherein:
    the metal layer --.

Signed and Sealed this

Nineteenth Day of August, 2003

JAMES E. ROGAN
*Director of the United States Patent and Trademark Office*